July 3, 1962
D. W. NORWOOD
3,041,928
DEVICE UTILIZING A LIGHT VALVE ACTUATED
BY A LIGHT ACCEPTANCE UNIT
Filed May 18, 1959
3 Sheets-Sheet 1
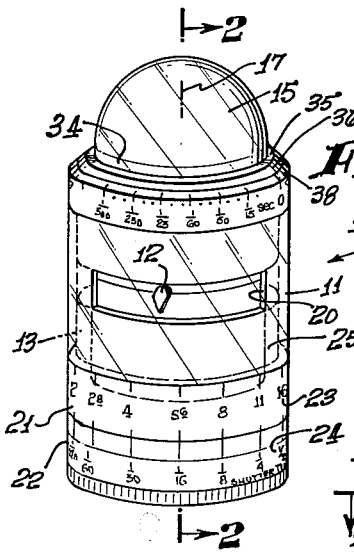
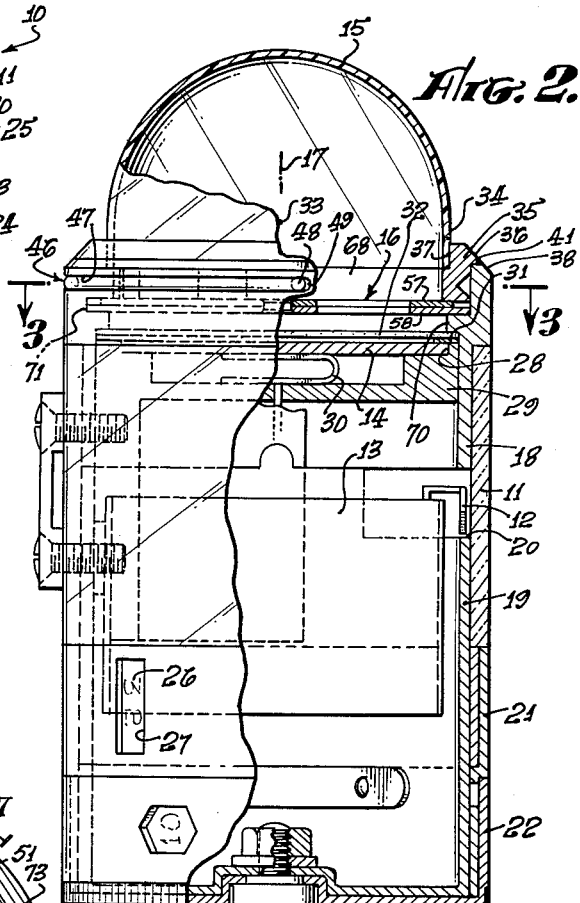
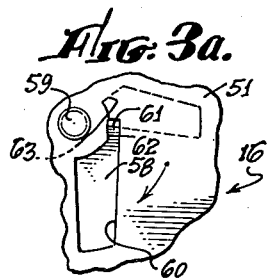
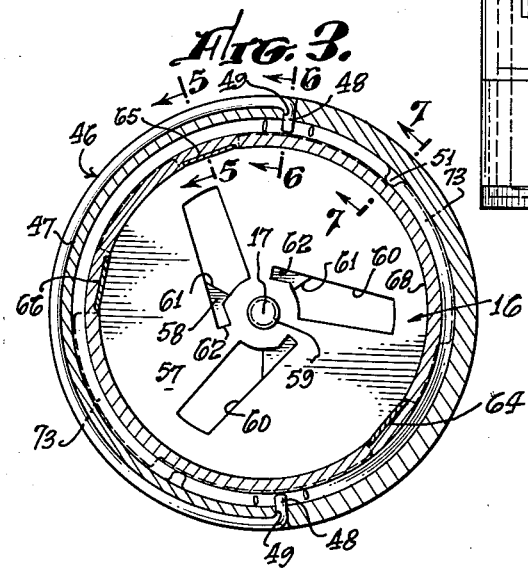
DONALD W. NORWOOD,
INVENTOR.
BY William P. Green
ATTORNEY.

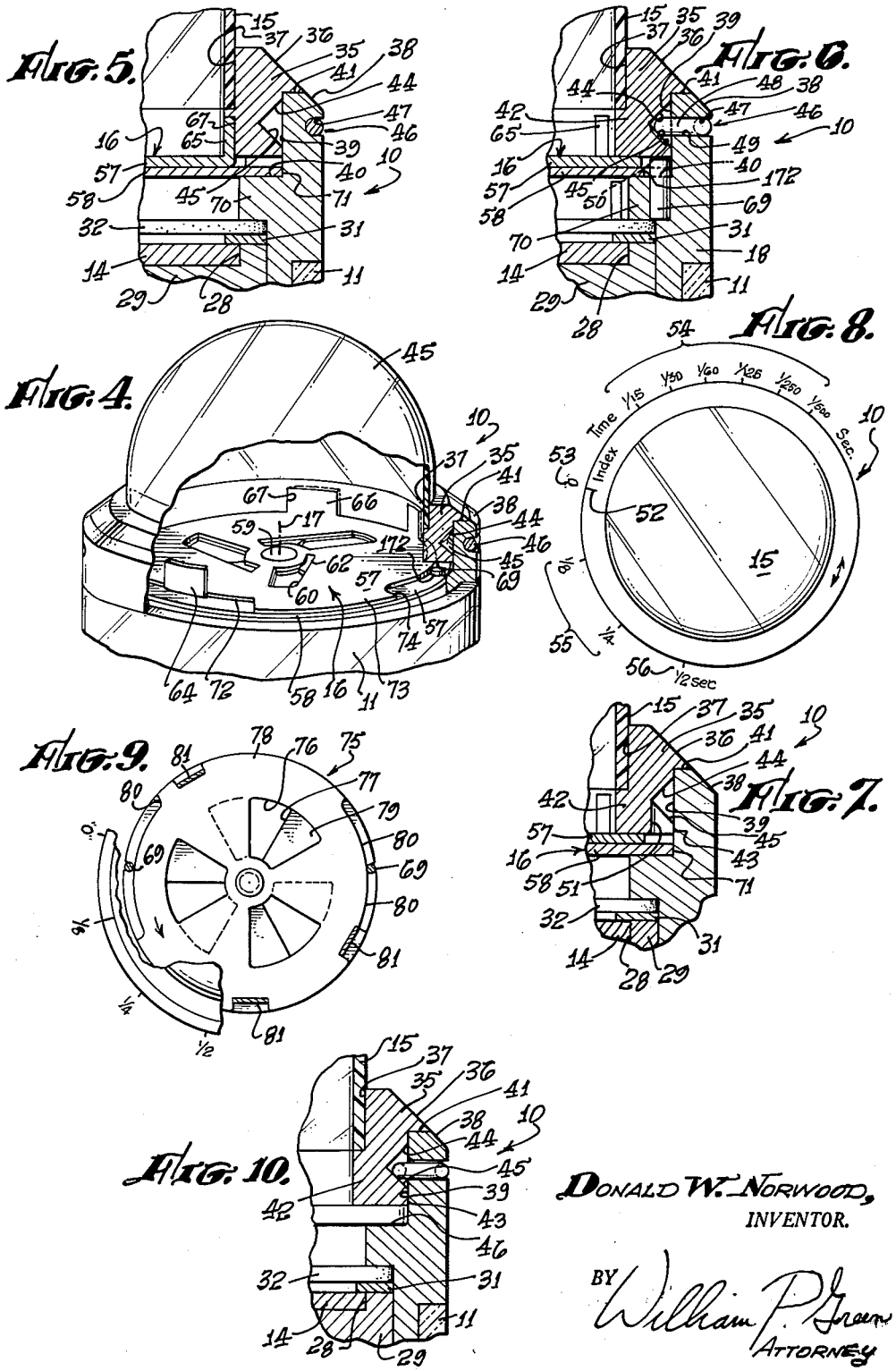

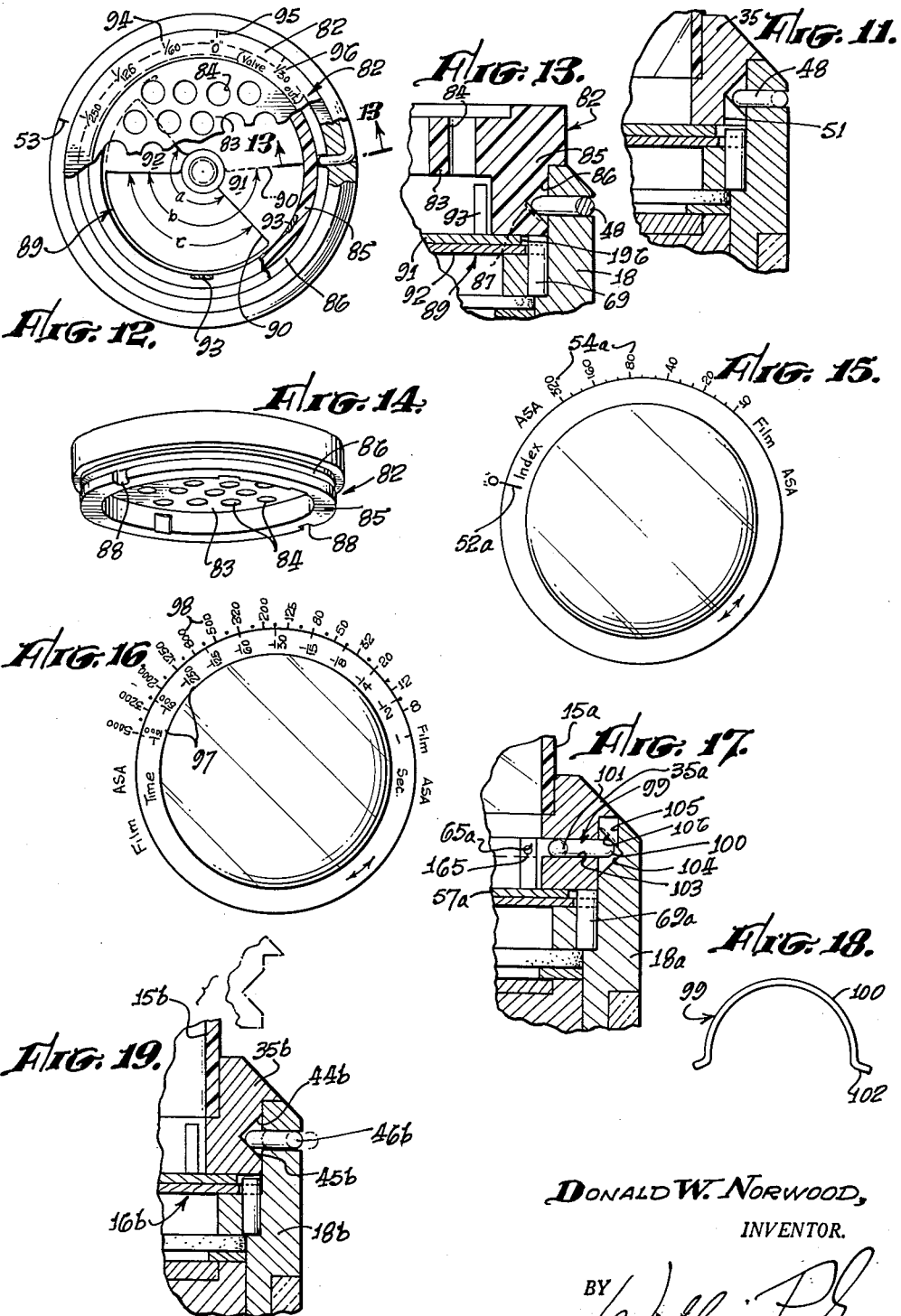

United States Patent Office 3,041,928
Patented July 3, 1962

3,041,928
DEVICE UTILIZING A LIGHT VALVE ACTUATED BY A LIGHT ACCEPTANCE UNIT
Donald W. Norwood, 1470 San Pasqual St., Pasadena, Calif.
Filed May 18, 1959, Ser. No. 813,744
19 Claims. (Cl. 88—23)

This invention relates to improved light responsive devices for use by photographers. For example, the features of the present invention can typically be applied to photographic light meters, but are not to be considered as limited to only light meters in their application, since most of these features can be applied broadly to other types of light responsive devices which are utilized by photographers. Some of the features of the typical embodiments of the invention which will be described in the present application have been described and claimed in my copending U.S. patent applications: No. 798,459, filed on March 10 1959 on "Device With Three Dimensional Light Collector," now U.S. Patent 2,983,186, No. 749,844, filed on July 21, 1958 on "Light Meter Device," now U.S. Patent No. 2,972,930, and No. 813,752, filed on May 18, 1959 on "Light Valve Structure."

A device embodying the present invention includes a light responsive element, such as a photovoltaic cell, a light acceptance unit for the cell, and an associated light valve assembly. The light acceptance unit may be either an incident light type of light collecting structure, or a reflected light type of light collecting structure. The acceptance unit in either case is so constructed and positioned as to receive whichever of these two types of light may be desired under particular circumstances, and to transmit that light in a desired manner to the photocell, so that the photocell may actuate an associated electrically controlled device in accordance with the light energization of the cell. The light valve is positioned along the path which the light follows in passing to the photocell, and this valve is adjustable to vary the proportion of the available light which is permitted to pass to the cell. Preferably, the valve is located axially between the light acceptance member and the photocell.

A major object of the present invention is to provide an improved valve-controlled light responsive assembly of this type in which the light acceptance member, valve and photocell are interrelated in a unique manner such that the overall operational and functional characteristics of the devices are vastly improved over those of prior devices intended for the same general purpose. An attempt has been made to reduce to an absolute minimum the structural elements required in the device, while at the same time allowing for a maximum range of adjustability to satisfy virtually all sets of conditions which may be encountered in photographic use. Of particular importance is the design and positioning of the valve assembly in a manner assuring against the protrusion of any portion of the valve assembly at the outside of the meter or other device, so that the valve assembly can not possibly interfere with the proper passage of light to the exterior of the light acceptance unit. This feature is of very great importance when the light acceptance unit is a translucent incident light type of light collecting dome. Further, the valve assembly is so designed as to avoid any possibility of this valve offering undue interference with the proper transmission of light within the interior of the device. In addition to these features, the device has been so constructed as to purposely facilitate the adjustment or setting of the valve to different conditions, and in a preferred form of the invention to allow for complete removal of the valve for one-hundred percent light transmission when necessary.

To attain these and other advantages, the light acceptance unit is so mounted as to be movable in a predetermined manner relative to the main body or housing of the device which carries the photocell. Further, the light valve assembly is so constructed and positioned as to be adjustable between its various different light passing conditions in response to the movement of the light acceptance un it. Preferably, the light acceptance unit is mounted for rotary movement through a predetermined range, and the light valve includes two elements, one of which is connected to the light acceptance movement for rotary adjustment therewith. The two elements of the light valve may be two closely proximate plates formed of opaque material, and containing apertures adapted to move into and out of registry as one of the plates is turned by the light acceptance unit. One plate may be keyed rotatively to the light acceptance unit, while the other plate is keyed to the main body or housing of the device. The relative rotary settings of the parts can be indicated by suitable markings, typically including coacting markings on the light acceptance unit and the main body structure. A particular feature of the invention has to do with a unique type of detenting mechanism for releasably detenting the light acceptance unit and the valve in various different settings.

In some forms of the invention, the light acceptance unit is free for detachment from the main body of the device, and such detachment of the light acceptance unit frees the light valve also for removal from the body. The removable parts may be releasably attached to the body of the device by means of a novel retainer element, which desirably also functions as the detenting unit for holding the adjustable parts in their different adjusted positions. The valve assembly may be designed to automatically limit the rotary adjusting movement of the light acceptance member to a predetermined limited range when the valve is in position in the device, but with the acceptance member being freed for additional movement beyond that range when the valve is removed. Also, two or more different valves may be selectively usable in the device, with the two valve assemblies being constructed to allow adjusting movement of the light acceptance unit through two different ranges of movement, so that when each valve is in use, the light acceptance unit is free for movement only within a predetermined range, within which range the relative settings of the parts are indicated by a certain associated group of markings in the light acceptance unit and housing.

The above and other features and objects of the present invention will be better understood from the following detailed description of the typical embodiments illustrated in the accompanying drawings in which:

FIG. 1 is a perspective view of a photographic light meter embodying the novelty of the present invention;

FIG. 2 is an enlarged view taken partly in side elevation, and partly in section along the line 2—2 of FIG. 1;

FIG. 3 is a transverse section taken on line 3—3 of FIG. 2;

FIG. 3a is a view showing two of the apertures of the FIG. 3 light valve as they appear in their minimum light transmission condition;

FIG. 4 is a fragmentary perspective view, partially broken away, showing certain portions of the FIG. 1 device;

FIGS. 5, 6 and 7 are enlarged fragmentary sections taken on lines 5—5, 6—6 and 7—7 respectively of FIG. 3;

FIG. 8 is a front view of the light collecting portion of the FIG. 1 device, showing diagrammatically the markings for indicating the various settings of the valve mechanism;

FIG. 9 is a view showing a second light valve to be used in the meter of FIG. 1;

FIG. 10 represents the device as it appears with neither of the two light valves in use;

FIG. 11 shows the various parts of the FIG. 1 device as they are aligned for insertion of the light acceptance member and valve into the body of the device, or for removal of these parts from the body;

FIG. 12 is a front view representing the meter of FIG. 1 with a reflected light type of acceptance unit, and associated valve, connected to the device;

FIG. 13 is an enlarged fragmentary section taken on line 13—13 of FIG. 14;

FIG. 14 is a perspective view of the reflected light acceptance grill shown in FIGS. 12 and 13;

FIGS. 15 and 16 represent variational types of markings which may be provided on the device in applying it to different uses;

FIG. 17 is a view similar to FIG. 11, but showing a variational form of interlocking and detenting element;

FIG. 18 is a view representing separately the interlocking and detenting element of FIG. 17; and FIG. 19 shows fragmentarily another form of the invention.

With reference first to FIGS. 1 and 2, the light meter 10 of those figures is typically represented as being of essentially cylindrical configuration, with a portion of the side wall of the body of the device taking the form of a cylindrical transparent wall 11, through which the arcuately movable electrically actuated pointer 12 of a microammeter 13 is visible. This microammeter is electrically operated by a circular photovoltaic cell 14, to which light passes from an incident light collecting dome 15 and through an adjustable light valve assembly 16. As will appear at a later point, the dome 15 and valve 16 can be detached from the body of meter 10, so that a different light acceptance unit and/or valve may be substituted.

Cylindrical transparent wall 11 of the meter body is centered about a main axis 17, which axis is also the axis of arcuate movement of indicating pointer 12. Wall 11 is rigidly connected in any suitable manner to a pair of upper and lower aligned opaque cylindrical wall elements 18 and 19, with the latter being cut away at 20 to provide a window through which pointer 12 is visible. At its lower end, element 19 may rotatably carry two rings 21 and 22, which are rotatably adjustable relative to parts 11, 18 and 19 about axis 17, and which carry an f-stop scale 23 and a shutter-time scale 24 respectively. The position of pointer 12 is readable against f-stop scale 23 through a channel chart 25 formed on part 19. Different settings for part 21 and its carried f-stop scale 23 are indicated by a series of stationary markings 26 which are visible through a window 27 formed in part 21, and which represent different ASA film sensitivities.

Photovoltaic cell 14 is confined within a circular recess 28 in a part 29, and is electrically contacted by a first conductor 30 at one side of the cell, and a conductive ring 31 at the other side. These contacts 30 and 31 are electrically connected to the microammeter 13 in any suitable manner, to energize the microammeter with current developed by cell 14. A transparent disc or window 32 may be provided above cell 14, as a protection for the cell.

The light collector element 15 takes the form of a convex dome or shell, formed of a translucent material, such as a suitable milky appearing resinous plastic material, for example typically cellulose acetate. The dome 15 in its preferred form may be defined as including an upper substantially hemispherical portion centered about a point 33, and a lower substantially cylindrical portion 34 centered about axis 17 and forming a continuation of the hemispherical portion at its base. This dome is carried by a rigid ring 35, which may have an annular frustro-conically tapered highly reflective surface 36 positioned as shown with respect to the dome 15. In accordance with the teachings of my copending application Serial No. 798,459, filed on March 10, 1959 on "Device With Three Dimensional Light Collector," the cylindrical portion 34 of dome 15 acts to increase the responsiveness of the dome to side lighting and back lighting rays; and the reflective surface 36 acts to reflect back-lighting rays onto the dome in a manner further increasing the responsiveness of the device to back lighting. In order to render surface 36 reflective in this manner, the part 35 may be formed of aluminum or other shiny metal, with surface 36 being either a mirror like surface or a satin finish surface. The base of dome 15 is mounted within an annular recess 37 in part 35, and is cemented or otherwise rigidly secured therein. Part 18 may have a frustro-conically tapered surface 38, shaped to form essentially a continuation of surface 36, except that surface 38 is not normally highly reflective. Preferably, surface 36 has a coefficient of reflection R of at least about .4, for all visible light.

The outer end portion of element 18 contains a recess within which ring 35 and valve assembly 16 are received, with that recess being defined by a cylindrical side wall 39 and a directly radially extending transverse wall 40 (see FIGS. 5, 6 and 7). Outwardly beyond surface 39, part 18 has a transverse annular end surface which is engaged by a corresponding shoulder or a transverse surface on part 35 at 41 to limit the axially inward movement of element 35 into part 18. The portion 42 of part 35 which projects into element 18 has cylindrical surfaces 43 which engage surface 39 to accurately center part 35 relative to element 18. Axially between these two surfaces 43, part 35 has an annular radially outwardly facing V-shaped groove, defined by two converging annular surfaces 44 and 45.

Ring 35 and the carried translucent dome 15 are detachable axially outwardly from element 18, and are releasably attached to element 18 by means of a spring 46 (see FIG. 3). This spring is formed of an elongated piece of spring wire, which is curved essentially semi-circularly about axis 17, and is received within a correspondingly shaped essentially semi-circular groove 47 formed in the outer surface of part 18. At its opposite ends, which are spaced circularly apart slightly more than 180 degrees, the spring wire 46 is turned radially inwardly at 48 to form two approximately diametrically opposed retaining and detenting lugs. These lugs or fingers formed by the ends of spring 46 project through apertures 49 in part 18, and have their inner ends projecting into annular groove 44—45 in element 35, to prevent axially outward movement of element 35 from its position of connection to part 18. The inner end of each spring finger 48 may be rounded, as shown in the figures, and desirably engages the axially inner wall 45 of that groove, rather than wall 44, so that part 35 is not free for any movement axially relative to part 18. Wall 45 has a series of circularly spaced detenting irregularities, preferably taking the form of detent notches 50 (see FIGS. 3 and 6). The resilience of spring 46 is such as to continuously yieldingly urge fingers 48 radially inwardly against surface 45, and into notches 50 when the fingers are opposite those notches, so that fingers 48 function to releasably detent ring 35 in any of different positions, as well as to hold ring 35 against axial withdrawal from part 18. As will be apparent, the portion of spring 46 which is adjacent each of the inturned fingers 48 is free for sufficient inward movement within groove 47 to allow the fingers 48 to always bear tightly against surface 45, and to move into notches 50 whenever the rotary positioning of part 35 moves one of the notches 50 into alignment with one of the fingers 48.

In order to allow for movement of part 35 and the carried dome 15 axially into and out of engagement with part 18, the annular portion of element 35 which is located axially inwardly of groove 44—45 is locally interrupted at two predetermined points to form a pair of notches 51 (see FIGS. 7 and 11) which are spaced circularly apart the same distance as the two fingers 48 formed by the ends of spring 46, and which are of sufficient width to pass fingers 48 axially through these notches 51 during assembly of the device. In order to connect part 35 and the carried dome 15 to element 18, the part 35 is merely turned to a position in which its notches 51 are aligned with fingers 48, so that part 35 may be inserted axially into part 18, and may then be turned so that fingers 48 move into groove 44—45 to hold element 35 against withdrawal.

To indicate the different rotary settings of element 35 and dome 15 relative to part 18 and the rest of the cell housing structure, parts 35 and 18 preferably have markings coacting to indicate these various settings. In the form of the device shown in FIG. 1, these markings typically include an index marking 52 formed on the reflective surface 36 of part 35 (see FIG. 8), and a series of coacting markings formed on the outer surface of element 18. These markings on element 18 are shown partially in FIG. 1, and are shown diagrammatically in FIG. 8 (FIG. 8 being diagrammatic in that the markings themselves would not actually appear in a true front view of the light collector assembly). The markings on part 35 may be considered as including a zero marking 53, a first group of markings 54 for representing different settings of value assembly 16, a second group of markings 55 for indicating different settings of another substitute valve to be discussed at a later point, and a marking 56 to be utilized when no valve is employed in the device. In the preferred form of the invention, all of these markings (except the zero or index marking 53) represent different camera shutter times, with the markings of group 54 representing times from $\frac{1}{15}$ of a second to $\frac{1}{500}$ of a second, and with the two markings of group 55 reading $\frac{1}{8}$ of a second and $\frac{1}{4}$ of a second, while the single marking 56 reads $\frac{1}{2}$ of a second. When index marking 52 is aligned with zero marking 53 on part 18, this indicates that notches 51 of part 35 are axially aligned with spring fingers 48, so that element 35 may be inserted axially into, or withdrawn from, element 18. The previously mentioned detent notches 50 in surface 45 of part 35 are appropriately positioned to detent part 35 in any of the various positions in which index 52 is aligned with one of the discussed shutter time markings on part 18, or when the index is aligned with any intermediate marking which may be provided.

Light valve assembly 16 includes two parallel plates 57 and 58 interconnected for relative rotary adjusting movement about axis 17, and engaging one another in face to face relation. These two plates are essentially circular, and are formed of an opaque material, preferably a suitable metal such as steel. Plates 57 and 58 are interconnected for their relative rotary adjusting movement by means of a central rivet 59, which extends through central registering openings in the two plates. Plate 57 has several (typically three) circularly spaced apertures 60, which coact with the same number of circularly spaced apertures 61 in plate 58, to vary the effective light passing area of the two-plate assembly in response to relative rotary adjusting movement of the plates. As is seen clearly in FIG. 3, the apertures 60 are elongated generally radially of axis 17, but are shaped at their inner ends to form portions 62 of the apertures which project generally circularly about axis 17. Each of the apertures 61 is shaped substantially the same as the associated aperture 60 except that the aperture 61 does not have the circularly projecting portion 62, but instead is terminated short of that projection by an edge 63 of aperture 61. The shapes of these apertures 60 and 61 are discussed in greater detail in my copending application Serial No. 813,752, filed May 18, 1959 on "Light Valve Structure."

In the maximum light transmission condition of valve assembly 16 (the condition represented in FIG. 3), substantially the entire aperture 61 registers with aperture 60, and the index marking 52 of FIG. 8 is positioned in alignment with the $\frac{1}{15}$ of a second shutter time marking on part 18. As valve disc 57 is turned in a clockwise direction as viewed in FIG. 3, the portions of the two apertures which register with one another progressively decrease in size, so that the effective light passing area of the two-plate assembly decreases, until the valve reaches its minimum light transmission condition, in which only the tip end of projection 62 of aperture 60 registers with aperture 61. This minimum light transmission setting is represented in FIG. 3a. In that setting of the valve, index marking 52 of FIG. 8 is received opposite the $\frac{1}{500}$ of a second shutter time marking on part 18. Thus, the set of markings designated by the numeral 54 in FIG. 8 are used in conjunction with value 16, to indicate its various settings.

In order that rotary movement of dome 15 and the attached part 35 can function to turn valve plate 57 relative to plate 58, the first mentioned of these plates is rotatively keyed to part 35, and the second plate is rotatively keyed to element 18. For this purpose, plate 57 has several portions about its periphery forming a series of circularly spaced axially turned fingers 64, 65 and 66 (see FIG. 3), which are receivable within individual recesses 67 formed in the inner cylindrical surface 68 of part 35. These fingers 64, 65 and 66 frictionally engage element 35 sufficiently tightly to frictionally hold the valve assembly against separation from ring 35 and the carried dome 15 during the insertion of these parts into, and removal of these parts from, element 18. In order to connect valve assembly 16 to part 35, fingers 64, 65 and 66 are aligned with their corresponding axially extending grooves or recesses 67, and are then forced axially into those grooves, with the fingers being very slightly deformed radially inwardly as they are thus forced into the grooves. The fingers have sufficient resilience to then bear tightly outwardly against the material of part 35 to effect the frictional interconnection of the parts. The radial resilience of these spring fingers also allows the rotary elements of the device to turn in unison without binding even though their respective centers may be slightly offset. As seen in FIG. 3, the fingers 64, 65 and 66 (and their mating recesses or grooves 67) are spaced non-uniformly about the periphery of element 57, so that these parts will interfit in only one relative rotary position. Preferably, two of the fingers 65 and 66 are located relatively close together, while the opposite finger 64 is positioned diametrically opposite a point circularly between fingers 65 and 66.

In order to rotatively key the second valve plate 58 to part 18, the latter may carry two hard metal cylindrical pins 69 (see FIGS. 4 and 6), which are rigidly mounted in fixed positions within an inwardly projecting flange portion 70 of part 18. This flange portion 70 of part 18 forms at its upper side the previously mentioned transverse annular surface 40. The axially outer end of each pin 69 projects axially beyond that surface 40 through a distance slightly less than the combined axial thickness of the two valve plates 57 and 58. Pins 69 are located closely adjacent to inner-cylindrical surface 39 of part 18, and the pins 69 are axially aligned respectively with the inner end portions of the two spring fingers 48.

Valve plate 58 is circular and of a diameter such that the outer circular edge 71 of this plate is a close fit within cylindrical surface 39 of part 18. The outer circular configuration of plate 58 is interrupted at two locations to form two peripheral notches 172, each of a size to closely receive one of the pins 69, in a manner effectively retaining plate 58 against any substantial rotary movement relative to element 18. The two notches 172 are of course spaced circularly slightly more than 180 degrees, in correspondence with the circular spacing of pins 69 and spring fingers 48.

Pins 69 also serve a second function of limiting the range of permissible rotary adjustment of valve plate 57 relative to plate 58. For this purpose, plate 57 has two circularly spaced reduced diameter portions 72 (see FIG. 4), forming two peripheral arcuate grooves or cutaways within which the ends of pins 69 are received. Circularly between these two grooves 72, plate 57 has two radially outwardly projecting portions 73, of a diameter corresponding to the external diameter of plate 58, to form shoulders 74 at the opposite ends of grooves 72 acting to engage pins 69 and thereby limit the relative rotary movement of plate 57.

Referring again to FIG. 8, the range of rotation of plate 57 which is permitted by pins 69 allows movement of index marking 52 in a clockwise direction from the illustrated zero position to the 1/500 of a second shutter time marking located at the end of the group of markings designated 54. The engagement of two of the shoulders 74 with the two pins 69 prevents counterclockwise rotation of index marking 52 and the plate 57 beyond the illustrated zero position, and the engagement of two other shoulders 74 with the pins 69 prevents rotation of the index marking and valve plate in a clockwise direction beyond the 1/500 of a second shutter time marking. Thus, the parts can be properly aligned for insertion, with the index marking at zero, and the index marking can be moved to a position of registry with any of the various markings 54, which group of markings are designed specifically for use when the discussed valve assembly 16 is mounted in the meter. However, the index marking can not be moved into a position of registry with any of the other markings 55 or 56, which are not intended to be used when valve 16 is in the device.

FIG. 9 represents a second valve assembly 75 which can be substituted for valve assembly 16 in the meter 10. This valve assembly 75 may be considered as being identical with valve assembly 16 except for the differences specifically noted below. Assembly 75 includes two plates 78 and 79, corresponding to plates 57 and 58 of assembly 16, but in which the apertures 76 and 77 are shaped differently than apertures 60 and 61. In particular, apertures 76 and 77 of the two plates 78 and 79 may form segments of a circle, as shown, and are adapted to allow considerably more light to pass through valve assembly 75 than could pass through assembly 16. As in the first form of valve, rotary adjustment of plate 78 relative to plate 79, by turning light acceptance dome 15 and the attached part 35, varies the amount of light which can pass through the valve. However, since more light passes through valve 75 in all of its positions, index marking 52 is designed to register with the group of markings 55, when valve 75 is in position, rather than the first group of markings 54. For this purpose, the two peripheral arcuate grooves 80 formed in plate 78 (corresponding to grooves 72 and plate 57) are so positioned as to allow rotation of plate 80 only between the zero index marking 53 and the ¼ of a second shutter time marking. These grooves 80 and the coacting stop pins 69 function to prevent the movement of the index marking to any other position while valve assembly 75 is mounted in the device, to prevent a user from inadvertently turning the dome and index marking to a setting which has no actual significance in connection with the valve being employed. The mounting ears 81 in FIG. 9 may be exactly the same as ears 64, 65 and 66 of FIG. 3, and the interengagement between pins 69 and plate 79 may be the same as has been discussed in connection with these pins and plate 58 in the first form of valve.

FIG. 10 represents another manner of using the meter, in which case both of the valves 16 and 75 have been completely removed from the device, so that readings may be taken with the device in a 100 percent light transmission condition. In this condition, dome 15 and the associated index marking 52 can move to the ½ of a second shutter time marking designated 56 in FIG. 8, which indicates that the meter is preset to assume a ½ of a second shutter time when no valve is employed. The index marking 52 can not move to this ½ of a second marking when either of the valves 16 or 75 is mounted in the meter.

FIGS. 12 through 14 show a reflected light type of light acceptance unit, which may be supplied with the meter 10, and which can be used instead of the incident light collecting unit 15—35 when a reflected light reading is desired. This acceptance unit of FIGS. 12 to 14 includes a reflected light grill 82, typically formed of a suitable opaque resinous plastic material, and forming a transverse wall 83 containing a series of parallel passages 84 extending in the direction of main axis 17 of the device. These passages 84 are adapted to pass reflected light inwardly in the direction of axis 17 to light responsive cell 14 while at the same time limiting the acceptance angle of the device. The apertures 84 are desirably spaced across essentially the entire light responsive surface of cell 14.

About its periphery, the circular element 82 has an axially inwardly projecting portion 85, which may be shaped essentially the same as inner portion 42 of the previously discussed element 35. This portion 85 contains a V-shaped annular recess 86, within which spring fingers 48 are received to retain part 82 against removal from element 18. Also, the axially inner wall of this V-shaped recess 86 contains detent notches 87, for releasably detenting element 82 in any of several different predetermined relative rotary positions. At two locations spaced circularly in correspondence with the spacing of spring fingers 48, the material of element 82 is cut away to form two notches 88, for passing spring fingers 48 into groove 86 during assembly of the device.

Reflected light acceptance grill 82 has a two plate valve assembly 89, which is essentially the same as assembly 16 of FIG. 2, except as follows. For one thing, the apertures 90 of the two plates 91 and 92 of valve assembly 89 are considerably larger than the apertures in either of the previously mentioned valves, so that these apertures are capable of passing a very large percentage of the available light. For example, the aperture in plate 91 may extend through an angle $a$ (FIG. 12) equal to somewhat more than 180 degrees, and the aperture in plate 92 may extend through a similar angle $b$, with both of these apertures taking the form of segments of a circle. In the setting of the valve illustrated in FIG. 12, the effective light transmitting port formed by the registering portions of the two apertures 90 extends through an angle $c$. Plate 91 of the assembly 89 has ears 93 for frictionally securing the valve assembly to element 82. Also, pins 69 coact with the peripheries of plates 91 and 92 in the same manner discussed previously in connection with valve assemblies 16 and 75.

In rotatively adjusting part 82 and valve plate 91 relative to elements 18 and 92, the different settings of the valve are indicated by a series of markings 94 which are typically formed on the part 82 itself, and which coact with zero marking 53 (see FIG. 12) on part 18. When a predetermined zero marking 95 on part 82 is aligned with zero marking 53 on element 18, the element 82 and valve assembly 89 can be withdrawn axially from their position of attachment to the rest of the meter structure. As in the other valves, the upper or axially outer plate 91 has two peripheral arcuate recesses 196, which coact with pins 69 to limit the range of rotary movement of element 82 relative to element 18, when the valve 89 is in position. The permitted range of movement when the valve is in use extends from a position in which the two zero markings 53 and 95 are aligned, to a position in which element 82 has been turned counter-clockwise to the end of the scale of markings 94. At the other side of zero marking 95, there is a 1/30 of a second shutter time marking 96, with which zero marking 53 can register only when the valve is removed, to indicate that the valve assumes a 1/30 of a second camera shutter time when the valve is removed.

To now described the manner of use of the meter structure disclosed in FIGS. 1 through 14, assume first that it is desired to use the meter as an incident light meter, and with the first described valve 16 in its active position. Assume also that the dome 15, ring 35, and valve assembly 16 are initially detached from the rest of the meter structure. To mount these parts on the meter, a user first inserts the fingers 64, 65 and 66 of the valve assembly into the mating recesses or groove 67 of element 35, and then turns valve plate 58 to a position in which its notches 72 are axially aligned with or opposite notches 51 formed in part 35 (see FIG. 11). With the notches thus aligned, the user holds dome 15, and by movement of that dome slips part 35 axially into its FIG. 11 position of engagement with part 18, while maintaining index markings 52 and 53 in registry as seen in FIG. 8, in order to assure proper interfitting of spring fingers 48 and pins 69 with the notches and cutaways 51, 72, and 172. After the parts have reached the FIG. 11 position, dome 15 and the attached element 35 may be turned in a clockwise direction (as viewed in FIG. 8), so that spring fingers 48 are received within groove 44—45, to retain the dome and ring 35 against removal.

With the apparatus in this position, dome 15 is turned until index marking 52 reaches a position of registry with a predetermined marking along the scale 54, representing a particular camera shutter time which is to be employed. Also, scale 23 is turned until the marking 32 visible through window 27 indicates a desired ASA film sensitivity, corresponding to that of the film being used. The user then aims dome 15 in a proper direction for obtaining an incident light reading, and notes the position of pointer 12 relative to scale 23, to obtain a direct reading of the proper f-stop setting to be employed under the particular lighting conditions, and with the camera shutter time and film sensitivity for which the device has been preset. Similar readings can be taken for other shutter times, by merely rotating dome 15 to thereby turn valve disc 57 to a changed setting, in which the effective light passing characteristics of valve 16 are changed to correspond to the new setting of index 52 along scale 54. Thus, the valve 16 can be very easily adusted to different settings by merely turning dome 15 to different rotary positions. Also, the positioning of the valve 16 entirely within the interior of the device assures against any interference by the valve with passage of light to the exterior of dome 15. Further, the very thin apertured plate type of valve shown at 16 allows for proper interior transmission of light from dome 15 to cell 14 without undue interference being offered by the valve assembly.

As has been previously mentioned, when valve assembly 16 is in use, the index marking 15 can not be turned to any shutter time setting other than those included in the group designated 54 in FIG. 8, so that the user can not possibly turn the device to a setting which does not have meaning in connection with the particular valve 16 which is being employed. If the lighting conditions are not good enough for use of the valve 16, the valve 75 can be substituted, with the setting of this valve being indicated by the group of markings 55, and with the valve assembly automatically preventing the turning of index marking 52 to any setting other than those in the desired group 55. Under extremely poor lighting conditions, both valves are removed, and the dome is turned to a position in which index marking 52 is opposite the 1/2 of a second marking, to remind the user that the reading obtained on scale 23 assumes the use of a 1/2 of a second shutter time.

If it is desired to take a reflected light reading, the reflected light acceptance grill 82 and valve 89 are substituted for the dome 15 and valves 16 and 75, and once again the valve can be adjusted by merely turning element 82 to any desired rotary setting, as indicated by the positioning of index marking 53 relative to the shutter time markings 94. If element 82 is employed without valve 89, then the user turns element 82 to a position in which the 1/30 second marking 96 is located opposite index marking 53, to remind the user that the device then assumes the use of a 1/30 of a second camera shutter time. When any of the light acceptance units or valves are in use, the scale 24 can be employed in conjunction with f-stop scale 23 to give a much wider variety of camera settings which can be used under the particular light conditions prevailing. However, the use of this added scale 24 actually constitutes no part of the present invention, and therefore will not be described in detail.

It is contemplated that the types of markings utilized for indicating the various valve settings in a device of the present type can of course be varied widely, to suit different operating circumstances. In this connection, it is noted that the four basic variable factors involved in photographic exposure control are the following:

(1) Photographically effective light.
(2) Film sensitivity.
(3) Camera shutter time.
(4) Camera lens aperture.

In the form of the invention thus far described, the adjustment of the light valve has functioned to adjust the device to assume a particular value for factor 3 above, that is, camera shutter time. It is contemplated however that, instead of this arrangement, the valve may be designed to assume a value for either factor 2 or factor 4, or any desired combination of factors 2, 3 and 4. Two such alternative arrangements are shown in FIGS. 15 and 16.

In FIG. 15, the series of markings 54a which are formed on the body of the device, and which coact with index markings 52a carried by the dome, read in terms of different film sensitivities. This type of marking is useful in conjunction with a motion picture camera, where factor 3 above is constant, and an adjustment of the valve to assume a particular film sensitivity will therefore allow the device to respond to factor 1 in terms of factor 4. This arrangement is also useful in a meter designed to read in terms of "Exposure Valve Scale" or "E.V.S." values, such as are employed in some cameras, which values represent a combination of factors 3 and 4.

FIG. 16 shows another marking arrangement which is useful under certain circumstances, and in which two different scales are provided on the parts 35 and 18 respectively of FIG. 1. For example, the part 35 may typically carry a first scale 97 reading in terms of shutter time (factor 3), with this scale being readable at any point against an adjacent scale 98 formed on element 18. Scale 98 may read in terms of ASA sensitivity (factor 2). Both of the scales 97 and 98 should be logarithmic in character, so that any particular setting of dome 15 will give an infinite number of different shutter time and ASA film sensitivity combinations which can be employed at that particular valve setting. That is, any two values which are positioned directly opposite one another can be used together, along with the f-stop setting (factor 4) indicated by pointer 12. In another arrangement similar to FIG. 16, the two relatively adjustable scales might read in terms of factors 2 and 4, in which case the meters response to actuation by factor 1 would be in terms of factor 3. As will be apparent, all of the different scale arrangements discussed above can be used with either an incident light or reflected light acceptance unit. Further, in any arrangement, the markings can of course be interchanged and reversed, so that for example in FIG. 1, the index marking could be carried by the meter body, and the scale could be carried by the dome.

FIGS. 17 and 18 illustrate another variational form of the invention, in which an internal retaining and detenting spring 99 is employed instead of the external spring 46 shown in FIGS. 2 and 3. This internal spring 99 has a circularly curved portion 100, extending through somewhat more than 180 degrees, and received within an arcuate groove 101 formed in the inner surface of part 35a (corresponding to part 35 of FIGS. 1, 2, etc.). Instead of the two inturned spring fingers 48 of FIG. 3, spring 99 has two radially outwardly projecting fingers 102, which extend through openings 103 in part 35a, and which project into a V-shaped annular groove 104 formed in element 18a (corresponding to part 18 of FIG. 2). The upper wall of groove 104 is interrupted at two locations to form notches 105, through which spring fingers 102 are movable axially inwardly, during assembly of the device. At locations offset circularly form these notches, fingers 102 engage upwardly against the upper wall of groove 104, and are receivable within different detent notches 106, to releasably retain element 35a and the carried dome 15a in any desired rotary setting. Resilient fingers 65a on upper valve plate 57a are received within axial grooves in part 35a (corresponding to grooves 67 of FIG. 5). Fingers 65a may extend to a location opposite groove 101, and may have portions deformed into groove 101 at 165 to function as detent lugs for releasably detenting the valve assembly against withdrawal from part 35a. As will be apparent, the groove 101 is made deep enough to avoid interference by element 99 with this detenting action of fingers 65a. Except with respect to these differences which have been specifically discussed in connection with FIGS. 17 and 18, the device shown in those figures may be the same as that of FIGS. 1, 2 and the other related figures. It is noted in FIGS. 17 and 18, that the notches 105 should be located at the same points about the circumference of element 18a as are pins 69a.

An additional form of the invention is shown in FIG. 19, in which the light acceptance dome 15b, ring 35b and valve 16b (or any other desired light acceptance unit and associated valve) are permanently attached to the meter or other light actuated unit, rather than being detachable therefrom. In order to permanently attach the parts 15b, 35b and 16b in this manner, it is necessary merely to omit the two notches or cutaways 51 formed in part 35 of FIGS. 1 through 8, so that the lower inclined wall 45b of the V-shaped groove 44b—45b is circularly continuous, and will engage spring fingers 48b in any setting of dome 15b and element 35b, to restrain the latter against movement axially outwardly from within part 18b. In assembling a device of this type, part 35b is first inserted into position within part 18b, and spring 46b is then applied to the device, so that its fingers 48b will lock the parts together, while still allowing relative rotation of element 35b and the carried dome 15b.

I claim:

1. A device comprising a housing, a light responsive element carried by said housing, means actuated by said element in accordance with the light energization thereof, a light acceptance unit mounted on said housing in a predetermined active position for rotary movement relative to the housing and adapted to be detached from the housing, said acceptance unit in said active position being located to pass light to said element and being constructed to define the angle from which light can be accepted by said device for transmission to said element, a light valve assembly removably positioned along the path of light between said acceptance unit and said element and adjustable to vary the transmission of light therebetween along said path, said valve assembly including two parts which are relatively rotatably adjustable to different light transmitting conditions, and means securing said two valve parts together for relative adjusting movement, said light acceptance unit having a portion blocking detachment of said valve assembly from the housing so long as the light acceptance unit remains attached to the housing but freeing said two valve parts for removal when said acceptance unit is detached from the housing, said securing means being constructed to continue to retain the valve parts together after detachment from the housing, and means for relatively rotatively adjusting said valve parts to different light transmitting conditions in response to rotary movement of the light acceptance unit relative to said housing while said acceptance unit is in said active position.

2. A device as recited in claim 1, in which said housing contains a recess receiving said valve assembly and from which said assembly is removable axially when said acceptance unit is detached from the housing.

3. A device as recited in claim 1, in which said light acceptance unit includes a translucent incident-light collector dome.

4. A device as recited in claim 1, in which said light acceptance unit is a reflected light transmission unit.

5. A device as recited in claim 1, in which said last mentioned means include means on said housing engageable with one of said valve parts in a relation retaining it against rotation, and means on said light acceptance unit engageable with the other valve part in a relation to turn it with said unit.

6. A device as recited in claim 1, in which said last mentioned means include a lug carried by said housing and received in a notch in one of said valve parts to retain it against rotary movement relative to the housing, and a plurality of axially turned fingers formed by the other valve part and frictionally receivable within coacting recesses formed in said light acceptance unit to key said other part thereto for rotation therewith.

7. A device as recited in claim 1, in which said last mentioned means include a lug carried by the housing and received in a notch in one of said valve parts to restrain rotation thereof, and means connecting the other valve part to said unit for rotation therewith, said other valve part containing an arcuate recess receiving said lug and coacting therewith to limit the rotation of said other valve part to a predetermined range.

8. A device as recited in claim 1, including coacting markings on said housing and said unit for indicating different settings of said valve assembly.

9. A device comprising a housing section, a light responsive element carried by said housing section, means actuated by said element in accordance with the light energization thereof, a light acceptance section mounted on said housing section in a predetermined active position for rotary movement relative to the housing section and adapted to be detached from the housing section, said acceptance section in said active position being located to pass light to said element and being constructed to define the angle from which light can be accepted by said device for transmission to said element, a light valve assembly removably positioned along the path of light between said acceptance section and said element and adjustable to vary the transmission of light therebetween along said path, said valve assembly including two parts which are relatively rotatably adjustable to different light transmitting conditions, and means securing said two valve parts together for relative adjusting movement, said light acceptance section having a portion blocking detachment of said valve assembly from the housing section so long as the light acceptance section remains attached to the housing section but freeing said two valve parts for removal when said acceptance section is detached from the housing section, said securing means being constructed to continue to retain the valve parts together after detachment from the housing section, means for relatively rotatively adjusting said valve parts to different light transmitting conditions in response to rotary movement of the light acceptance section relative to said housing section while said acceptance section is in said active position, and a lug carried by one of said sections and releasably projecting essentially radially into an arcuate groove formed in the other section to retain the two sections against axial separation.

10. A device as recited in claim 9, there being a cutaway area in a side wall of said groove adapted to pass said lug axially therethrough and to thereby allow separation of the sections in one rotary setting of said acceptance section.

11. A device comprising a housing section, a light responsive element carried by said housing section, means actuated by said element in accordance with the light energization thereof, a light acceptance section through which light passes to said element and mounted for rotary movement relative to the housing section about a predetermined axis, a light valve interposed between said light acceptance section and said element and adjustable to vary the transmission of light therebetween, said valve including two closely proximate apertured plates disposed generally transversely of said axis and mounted for relative rotary adjusting movement about said axis, a connection between said housing section and one of said plates retaining said one plate against rotation relative to the housing section, a second connection between said light acceptance section and the other plate connecting said other plate to the light acceptance section for rotation therewith, one of said sections having an essentially annular wall, a spring extending arcuately along said essentially annular wall and having its opposite ends turned essentially radially and projecting through apertures in said wall, the other of said sections having an essentially arcuate shoulder engageable by said ends of the spring in a relation retaining the light acceptance section against removal from the housing section.

12. A device as recited in claim 11, in which said shoulder contains detent recesses engageable by at least one end of the spring to releasably detent the sections in different relative settings thereof, there being interruptions in said shoulder through which said ends of the spring may pass in a predetermined relative setting of the sections and in a direction allowing separation of the sections one from the other.

13. A device comprising a housing section, a light responsive element carried by said housing section, means actuated by said element in accordance with the light energization thereof, a light acceptance section through which light passes to said element and mounted for rotary movement relative to the housing section about a predetermined axis, a light valve interposed between said light acceptance section and said element and adjustable to vary the transmission of light therebetween, said valve including two closely proximate apertured plates disposed generally transversely of said axis and mounted for relative rotary adjusting movement about said axis, a connection between said housing section and one of said plates retaining said one plate against rotation relative to the housing section, a second connection between sadi light acceptance section and the other plate connecting said other plate to the light acceptance section for rotation therewith, one of said sections having an essentially annular wall, a spring extending arcuately along said essentially annular wall and having its opposite ends turned essentially radially and projecting through apertures in said wall, the other of said sections having detent irregularities engageable by one of said ends of the spring to releasably detent the sections in different relative positions.

14. A device comprising a housing section, a light responsive element carried by said housing section, means actuated by said element in accordance with light energization thereof, a light acceptance section through which light passes to said element and mounted for rotary movement relative to the housing section about a predetermined axis, a light valve interposed between said light acceptance section and said element and adjustable to vary the transmission of light therebetween, said valve including two closely proximate apertured plates disposed generally transversely of said axis and mounted for relative rotary adjusting movement about said axis, a connection between said housing section and one of said plates retaining said one plate against rotation relative to the housing section, a second connection between said light acceptance section and the other plate connecting said other plate to the light acceptance section for rotation therewith, said first mentioned connection including a lug carried by the housing and received in a notch in said one plate, said other plate having an arcuate recess receiving said lug and coacting therewith to limit the rotation of said other plate to a predetermined range, and a second valve adapted to be substituted for said first valve and having first and second apertured plates adapted to be keyed to said two sections respectively, said second plate of said second valve having an arcuate recess for receiving said lug and positioned to limit the rotary movement of said acceptance unit to a different range of movement than said range of the first valve, and two groups of markings for indicating different settings of the acceptance unit within said two different ranges respectively.

15. A device as recited in claim 14, in which there is an additional marking on one of said sections designating another setting to which the acceptance unit is movable only when both valves are removed.

16. A device comprising a housing, a light responsive element carried by said housing, means actuated by said element in accordance with the light energization thereof, a light acceptance unit through which light passes to said element and constructed to define the angle from which light can be accepted by said device for transmission to said element, said acceptance unit being mounted for predetermined movement relative to said housing, a light valve positioned along the path of light between said acceptance unit and said element and adjustable to vary the transmission of light therebetween along said path, and means for actuating said valve progressively through a series of different light transmitting conditions in response to said movement of the light acceptance unit through a first predetermined range of movement, said acceptance unit being constructed and positioned to be actuable through said predetermined range of movement without substantially altering the effective acceptance angle or light transmission characteristics of said unit, markings indicating said series of different settings of the light valve as the acceptance unit is actuated through said range, said valve being removable from the housing, a second of said valve positionable in the housing in lieu of said first mentioned valve and adapted to be actuated by said movement of the light acceptance unit, means for limiting the movement of said light acceptance unit relative to the housing to a first range of movement when a first of said valves in in said path, and means for limiting the movement of said acceptance unit to a second and different range when the second valve is in said path.

17. A device comprising a housing, a light responsive element carried by said housing, means actuated by said element in accordance with the light energization thereof, a light acceptance unit through which light passes to said element and constructed to define the angle from which light can be accepted by said device for transmission to said element, said acceptance unit being mounted for predetermined movement relative to said housing, a light valve positioned along the path of light between said acceptance unit and said element and adjustable to vary the transmission of light therebetween along said path, and means for actuating said valve progressively through a series of different light transmitting conditions in response to said movement of the light acceptance unit through a first predetermined range of movement, said acceptance unit being constructed and positioned to be actuable through said predetermined range of movement without substantially altering the effective acceptance angle or light transmission characteristics of said unit, markings indicating said series of different settings of the light valve as the acceptance unit is actuated through said range, said valve being removable from the housing, said light acceptance unit being free for movement relative to the housing within a second predetermined range of movement greater than said first range when the valve is removed from the housing, and there being means limiting the movement of said acceptance unit to said first and narrower range when the valve is in said active position.

18. A device comprising a housing section, a light responsive element carried by said housing section, means actuated by said element in accordance with the light energization thereof, a light acceptance section through which light passes to said element and mounted for rotary movement relative to the housing section about a predetermined axis, a light valve interposed between said light acceptance section and said element and adjustable to vary the transmission of light therebetween, means for adjusting said valve in response to rotation of said light acceptance section relative to said housing section, a spring pressed element carried by one of said sections and projecting essentially radially into an arcuate groove formed in the other section in a relation retaining the two sections against axial separation while permitting relative rotation of the sections, and detenting irregularities in said groove engageable by said spring pressed element in a relation releasably detenting the sections in a plurality of different relative settings.

19. A device as recited in claim 18, in which said groove has a wall which is locally interrupted at a predetermined point to provide a space through which said spring pressed element may pass in a predetermined relative setting of the section and in a direction allowing separation of the sections one from the other.

References Cited in the file of this patent

UNITED STATES PATENTS

| | | |
|---|---|---|
| 2,178,197 | Bing | Oct. 31, 1934 |
| 2,214,283 | Norwood | Sept. 10, 1940 |
| 2,396,998 | Garstang et al. | Mar. 19, 1946 |
| 2,475,108 | Nicholson | July 5, 1949 |
| 2,587,601 | Crandell et al. | Mar. 4, 1952 |
| 2,824,696 | Norwood | Feb. 25, 1958 |
| 2,865,247 | Crandell et al. | Dec. 23, 1958 |